US007010422B2

(12) United States Patent
Park

(10) Patent No.: US 7,010,422 B2
(45) Date of Patent: Mar. 7, 2006

(54) LIMP HOME CONTROL METHOD UNDER DISCONNECTED STATE OF BATTERY POWER LINE

(75) Inventor: Yong-Jung Park, Gyeonggi-do (KR)

(73) Assignee: Hyundai Motor Company, (KR)

(*) Notice: Subject to any disclaimer, the term of this patent is extended or adjusted under 35 U.S.C. 154(b) by 0 days.

(21) Appl. No.: 10/980,902

(22) Filed: Nov. 3, 2004

(65) Prior Publication Data

US 2005/0119823 A1 Jun. 2, 2005

(30) Foreign Application Priority Data

Nov. 4, 2003 (KR) ..................... 10-2003-0077543

(51) Int. Cl.
*F02D 45/00* (2006.01)

(52) U.S. Cl. ..................................................... 701/114

(58) Field of Classification Search ..................... None
See application file for complete search history.

(56) References Cited

U.S. PATENT DOCUMENTS 4,580,222 A * 4/1986 Fujii .......................... 701/114
6,662,780 B1 12/2003 Yook

OTHER PUBLICATIONS

Derwent abstract of KR 369166 B, Jan. 24, 2003, and KR 2002037829 A, May 23, 2002, Jang.*

Patent Abstracts of Japan, Publication No. 2001-327001 (2001).

* cited by examiner

*Primary Examiner*—Andrew M. Dolinar
(74) *Attorney, Agent, or Firm*—Peter F. Corless; Edwards Angell Palmer & Dodge LLP

(57) ABSTRACT

Limp home control methods are provided for situations of a disconnected battery power line. Preferred methods may comprise steps of: determining whether a battery voltage (V_EL) provided to an Engine Control Unit (ECU) via a main relay is less than or equal to a first standard value; correcting vehicle control factors according to the battery voltage (V_EL), if the battery voltage (V_EL) provided to the Engine Control Unit (ECU) via the main relay is larger than the first standard value; determining whether a battery voltage (V_IGK) provided to the ECU via an ignition key is less than or equal to a second standard value, if the battery voltage (V_EL) provided to the ECU via the main relay is less than or equal to the first standard value; determining that a line providing the battery voltage (V_EL) from a rear end of the main relay to the ECU is disconnected, if the battery voltage (V_IGK) provided to the ECU via the ignition key is larger than the second standard value; and correcting vehicle control factors according to the battery voltage (V_IGK) provided to the ECU via the ignition key, if the line providing the battery voltage (V_EL).

2 Claims, 1 Drawing Sheet

LIMP HOME CONTROL METHOD UNDER DISCONNECTED STATE OF BATTERY POWER LINE

CROSS-REFERENCE TO RELATED APPLICATIONS

The present application is based on, and claims priority from, Korean Application Serial Number 10-2003-0077543, filed on Nov. 04, 2003, the disclosure of which is hereby incorporated by reference herein in its entirety.

FIELD OF THE INVENTION

The present invention relates to limp home control methods and systems. More particularly, in preferred aspects, the present invention relates to limp home control methods and systems adapted to correct one or more vehicle control factors by using a battery voltage measured through an alternative route in the event a power line for measuring battery voltage is disconnected. The power line for measuring battery voltage suitably connects a rear end of a main relay and Engine Control Unit (ECU).

BACKGROUND OF THE INVENTION

In general, an ECU detects a battery voltage through a power line for measuring battery voltage and corrects various vehicle control factors by using the detected battery voltage. The power line for measuring battery voltage connects the rear end of a main relay and ECU.

However, although battery power is normally provided to each actuator via the main relay, if the battery voltage is detected as being zero due to an improper connection of the power line for measuring battery voltage, various vehicle control factors are incorrectly adjusted based on the erroneously detected battery voltage, resulting in the potentially unsafe control of the vehicle.

Vehicle control factors that are corrected according to the battery voltage may include an ignition dwell time, injection dead time, cooling fan, idle speed, purge control and the like.

If such vehicle control factors are improperly adjusted as a result of an erroneously detected battery voltage, notable problems may occur. Thus, by such improper adjustment resulting from an incorrectly detected battery voltage, an excessive dwell time can be applied at an ignition coil, thus severely affecting the durability of the ignition coil and potentially generating a fire. Further, inappropriate adjustment of the injection dead time can require more fuel, thus decreasing the fuel economy of the vehicle and erroneously illuminating the engine check lamp. Additionally, increased operation of the cooling fan can generate an electric discharge, and the increase in the idle speed can reduce fuel economy.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the invention provides methods and systems to correct one or more vehicle control factors by using a battery voltage measured through an alternative route, if a power line for measuring battery voltage is disconnected while the battery power is normally provided to each actuator via the main relay. Suitably, the power line for measuring battery voltage connects the rear end of the main relay and ECU.

In preferred aspects, a limp home control method is provided for situations of a disconnected battery power line and comprises determining whether a battery voltage (V_EL) provided to the Engine Control Unit (ECU) via a main relay is less than or equal to a first standard value; correcting one or more vehicle control factors according to the battery voltage (V_EL) if the battery voltage (V_EL) provided to the Engine Control Unit (ECU) via the main relay is greater than the first standard value; determining whether a battery voltage (V_IGK) provided to the ECU such as via an ignition key is less than or equal to a second standard value if the battery voltage (V_EL) provided to the ECU such as via the main relay is less than or equal to the first standard value; determining that a line providing battery voltage (V_EL) from the rear end of the main relay to the ECU is disconnected, if the battery voltage (V_IGK) provided to the ECU such as via the ignition key is larger than the second standard value; and correcting one or more vehicle control factors according to the battery voltage (V_IGK) provided to the ECU such as via the ignition key if the line providing the battery voltage (V_EL) is determined to be disconnected.

It is understood that the term "vehicle" or other similar term as used herein is inclusive of motor vehicles in general such as passenger automobiles, buses, trucks, various commercial vehicles, and the like.

Other aspects of the invention are discussed below.

BRIEF DESCRIPTION OF THE DRAWINGS

For a better understanding of the nature and objects of the present invention, reference should be made to the following detailed description with the accompanying drawing, in which.

DETAILED DESCRIPTION OF THE INVENTION

Figure 1:
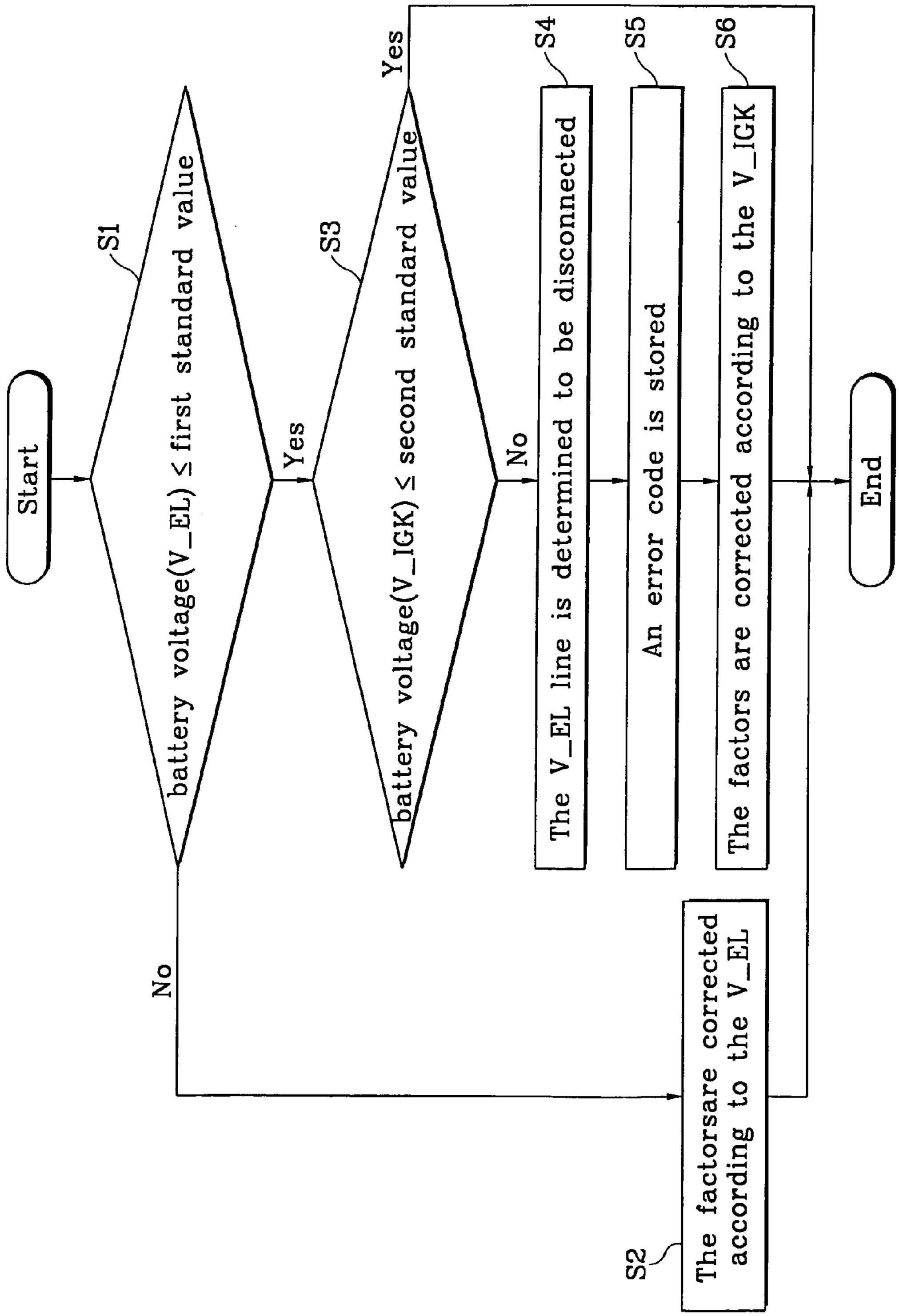
FIG. 1 is a flowchart depicting a limp home control method under a disconnected state of a battery power line according to an embodiment of the present invention.

A limp home control method under a disconnected state of a battery power line according to a preferred embodiment of the present invention will now be described in detail with reference to FIG. 1.

The Engine Control Unit (ECU) detects a battery voltage (V_EL) provided to the ECU via a main relay and determines whether the V_EL is less than or equal to a first standard value (step 1). If the battery voltage (V_EL) is less than or equal to the first standard value, step 3 is performed. However, if the battery voltage (V_EL) is larger than the first standard value, step 2 is executed.

Next, the ECU corrects one or more vehicle control factors according to the battery voltage (V_EL) detected from step 1, in which the vehicle control factors include an ignition dwell time, injection dead time, cooling fan, idle speed, purge control and the like (step 2).

In step 3, the ECU detects a battery voltage (V_IGK) provided to the ECU via an ignition key and determines whether the battery voltage (V_IGK) is less than or equal to a second standard value. If the battery voltage (V_IGK) is larger than the second standard value, step 4 is carried out.

In step 4, the ECU assumes that the power line for measuring battery voltage is disconnected, wherein the power line for measuring battery voltage is connected to the rear end of the main relay to allow the ECU to measure the battery voltage (V_EL), thereby performing step 5.

The ECU suitably stores a relevant error code in step 5 and performs step 6.

In step 6, the ECU corrects one or more vehicle control factors such as an ignition dwell time, injection dead time, cooling fan, idle speed, purge control and the like, according to the battery voltage (V_IGK) provided to the ECU via the ignition key, wherein the V_IGK value is measured in the above step 3.

Methods of the invention thus can provide notable advantages, including correctly adjusting one or more vehicle control factors by using a battery voltage measured through an alternative route if a power line for measuring battery voltage is disconnected while the battery power is normally provided to each actuator via the main relay, in which the power line for measuring battery voltage connects the rear end of the main relay and ECU. Such methods enable correct adjustments of vehicle control factors which can provide safe control of a vehicle.

While the invention has been described with reference to specific embodiments, modifications and variations of the invention may be constructed with departing from the scope of the invention, which is defined in the following claims.

What is claimed is:

1. A method for limp home control, comprising:

determining whether a battery voltage (V_EL) provided to an Engine Control Unit (ECU) via a main relay is less than or equal to a first standard value;

correcting one or more vehicle control factors according to the battery voltage (V_EL) if the battery voltage (V_EL) provided to the ECU via the main relay is greater than the first standard value;

determining whether a battery voltage (V IGK) provided to the ECU via an ignition key is less than or equal to a second standard value if the battery voltage (V_EL) provided to said ECU via the main relay is less than or equal to the first standard value;

determining that a line providing the battery voltage (V_EL) from the rear end of the main relay to the ECU is disconnected if the battery voltage (V_IGK) provided to the ECU via the ignition key is larger than the second standard value; and correcting one or more vehicle control factors according to the battery voltage (V_IGK) provided to the ECU via the ignition key if said line providing the battery voltage (V_EL) is determined to be disconnected.

2. The method of claim 1, further comprising storing a relevant error code if the line providing the battery voltage (V_EL) from the rear end of the main relay to said ECU is determined to be disconnected.

* * * * *